US007386954B2

(12) United States Patent
Korte et al.

(10) Patent No.: US 7,386,954 B2
(45) Date of Patent: Jun. 17, 2008

(54) WATERING AND TRANSPORT DEVICE FOR PLANTS

(75) Inventors: Hermann Korte, Surwold (DE); Rudolf Schomaker, Sögel (DE); Reinhold Trinczek, Grabau (DE)

(73) Assignee: Dipl.-Ing. Herman Korte, Surwold (DE)

( * ) Notice: Subject to any disclaimer, the term of this patent is extended or adjusted under 35 U.S.C. 154(b) by 144 days.

(21) Appl. No.: 11/333,599

(22) Filed: Jan. 17, 2006

(65) Prior Publication Data

US 2006/0185229 A1    Aug. 24, 2006

(30) Foreign Application Priority Data

Jan. 28, 2005   (DE) ...................... 10 2005 004 749

(51) Int. Cl.
*A47G 7/00* (2006.01)
(52) U.S. Cl. .......................................................... 47/39
(58) Field of Classification Search ................... 47/39; 211/187, 85.8; 280/33.998, 79.3, 79.7
See application file for complete search history.

(56) References Cited

U.S. PATENT DOCUMENTS

| | | | |
|---|---|---|---|
| 2,654,346 A | 10/1953 | Goff | |
| 3,086,364 A | 4/1963 | Chapin | |
| 3,108,400 A | 10/1963 | Wolfe, Jr. | |
| 3,455,054 A | 7/1969 | Camp, Jr. | |
| 3,482,785 A | 12/1969 | Chapin et al. | |
| 3,606,157 A | 9/1971 | Chapin | |
| 3,628,805 A * | 12/1971 | Archer | 280/33.998 |
| 3,664,063 A * | 5/1972 | Louis | 47/39 |
| 3,772,827 A * | 11/1973 | Louis | 47/39 |
| 3,797,842 A | 3/1974 | Swick, Jr. et al. | |
| 3,822,672 A | 7/1974 | Janson et al. | |

(Continued)

FOREIGN PATENT DOCUMENTS

DE        2204583        8/1973

(Continued)

OTHER PUBLICATIONS

French Patent FR 2805965 to Mieulet, Sep. 14, 2001, English Translation, 30 pages.

*Primary Examiner*—Michael R. Mansen
*Assistant Examiner*—Monica L Williams
(74) *Attorney, Agent, or Firm*—Fulbright & Jaworski; Jan K. Simpson

(57) ABSTRACT

A watering and transport device for plants, with a rectangular base platform, at each of the four corner regions of which is disposed, perpendicularly thereto, a support socket, in each of which is received a frame strut in a vertical position and provided with a longitudinal slot and insertion recesses, wherein the frame struts can be received in the support sockets either in a transport position or in a storage position, which is rotated by comparison thereto, and wherein a number of storage platforms are stacked one on top of the other the base platform, said storage platforms each having, in corner regions, a mounting member which has an insertion end portion ending freely, and wherein an upper rim portion of each support socket is located at such a height above the base platform that there is a vertical space between it and the insertion end portions of a bottom storage platform, so that the latter do not rest on the support sockets bearing a load.

14 Claims, 10 Drawing Sheets

U.S. PATENT DOCUMENTS

| | | |
|---|---|---|
| 4,163,342 A | 8/1979 | Fogg et al. |
| 4,250,666 A | 2/1981 | Rakestraw |
| 4,276,720 A | 7/1981 | Lyon |
| 4,571,883 A | 2/1986 | Shaw |
| 5,048,462 A | 9/1991 | Hostetler |
| 5,355,618 A | 10/1994 | Pedersen |
| 5,673,511 A | 10/1997 | Holtkamp, Jr. |
| 5,826,375 A | 10/1998 | Black et al. |
| 5,956,893 A | 9/1999 | Harrison |
| 5,960,827 A | 10/1999 | Rosenberg et al. |
| 5,987,812 A | 11/1999 | Knell |
| 6,243,985 B1 | 6/2001 | Miller |
| 6,470,625 B1 | 10/2002 | Byun et al. |
| 6,695,231 B2 | 2/2004 | Dramm et al. |
| 6,820,757 B2 | 11/2004 | Craft et al. |
| 6,843,022 B1 | 1/2005 | Holley |
| 6,957,627 B1 | 10/2005 | Knippelmeir |
| 2002/0029517 A1 | 3/2002 | Hutchinson et al. |
| 2002/0152677 A1 | 10/2002 | Park |
| 2002/0189163 A1 | 12/2002 | Cooper |
| 2004/0035813 A1* | 2/2004 | Sparkowski ............... 211/187 |
| 2005/0039390 A1 | 2/2005 | Sharples et al. |
| 2005/0055877 A1 | 3/2005 | Schomaker et al. |
| 2005/0081438 A1 | 4/2005 | Schomaker et al. |

FOREIGN PATENT DOCUMENTS

| | | |
|---|---|---|
| DE | 2800575 | 7/1978 |
| DE | 3619262 | 12/1987 |
| DE | 10003837 | 10/2000 |
| EP | 0409031 | 1/1991 |
| EP | 0614794 | 9/1994 |
| FR | 2297557 | 8/1976 |
| FR | 2805965 | 9/2001 |
| GB | 1569405 | 6/1980 |

* cited by examiner

Fig. 10
Fig. 11
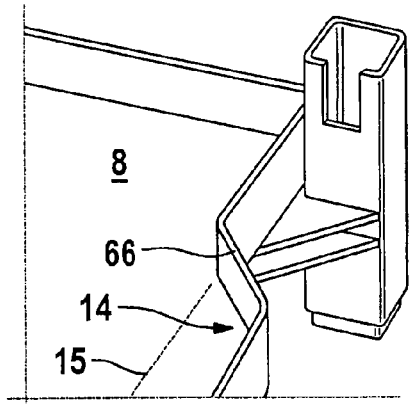
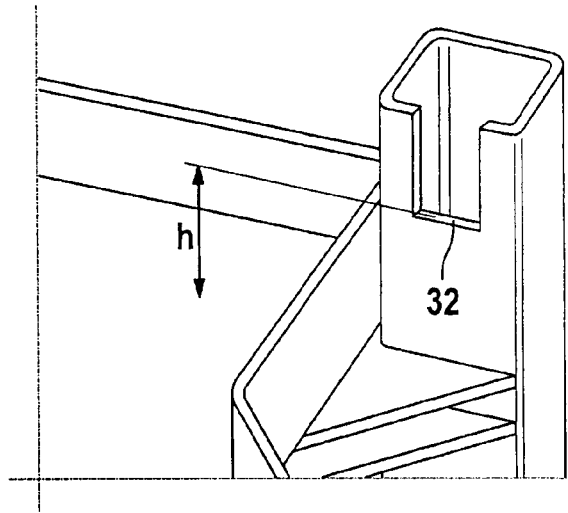
Fig. 12
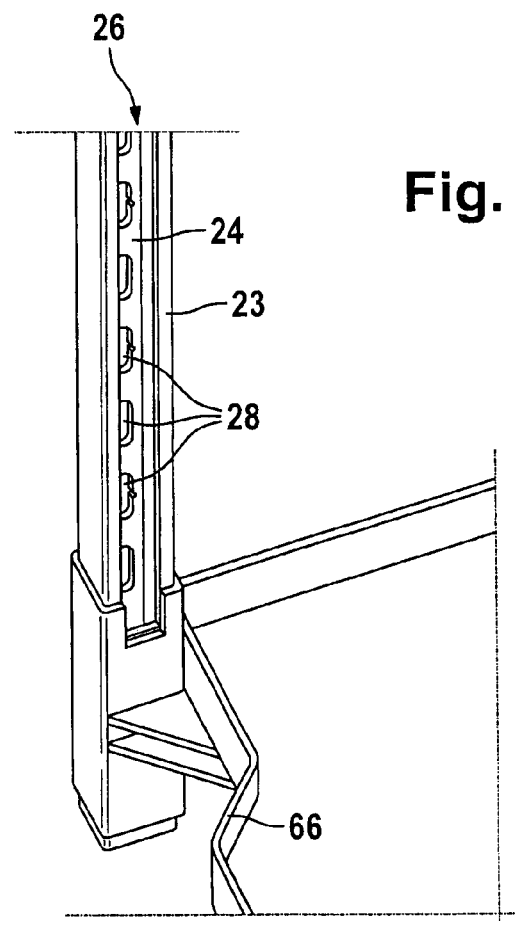

WATERING AND TRANSPORT DEVICE FOR PLANTS

TECHNICAL FIELD

The invention relates to a watering and transport device for plants and a base platform for it.

BACKGROUND OF THE INVENTION

Watering and transport devices for plants of the kind which are used, for example, for delivering and storing potted and garden plants in garden centers and similar sales outlets are known from, for example, DE 20213719. When devices of this kind are being transported (back) empty, the problem regularly arises as to how the numerous storage platforms on which the plants had been standing during shipment can now be housed in as compact and space-saving an arrangement as possible on the base platform or on the frame struts so that the best possible use is made of the available cargo space in the delivery vehicles used for this purpose, and so that this process can be conducted in as short a time as possible.

Conventionally, the method adopted for this is that the individual storage platforms are hung one on top of the other in the frame struts in as densely packed an arrangement as possible, i.e. so that a storage platform is hung in the insertion recesses of each individual level. This is very time-consuming and does not make the best possible use of the space which would actually be available in the vertical direction.

It is known per se from DE 28 00 575 C2 to insert the frame struts into the support sockets in a transport position, in which their longitudinal slots are facing each other, or inwards, i.e. in a position which is rotated by 180° compared to the storage position. In this position, a number of storage platforms can be stacked one after the other on the base platform from above, and it is no longer necessary to hang the insertion end portions in the insertion recesses, since they instead extend into/through the longitudinal slots and are received in a hollow space inside the frame struts. This leads to a saving of labor time both in creating the transport position (storage platforms are stacked on the base platform) and in the reverse procedure, in which the individual storage platforms have to be removed and are again hung in frame struts mounted on a base platform, which have of course previously been inserted the other way round or are located in the storage position. Nevertheless, this stacking method has never been used in practice, because the mounting members on the bottom storage platform in each case had to bear the entire weight of all the stacked storage platforms and could not take the load.

The invention is based on the object of making an improvement here and providing a watering and transport device for plants in which the storage platforms can be arranged for transport purposes more quickly and more closely packed than hitherto, and without the risk of damage.

BRIEF SUMMARY OF THE INVENTION

From the device point of view, this object is achieved by a watering and transport device for plants according to claim 1. Depending on the cross-sectional shape and configuration of the frame struts, the storage position may be staggered by a different angle relative to the transport position, such as by 90°. In the case of U or C-shaped frame struts, the angle is 180° if the insertion recesses are integrated into the web portions between the limbs.

The term "longitudinal slot" is used herein to denote any kind of open area, space or aperture running along the length of the frame struts which makes it possible to receive the insertion recesses of the storage platforms. A frame strut with an L-shaped cross-section, in one limb of which the insertion recesses are arranged one after the other, thus has a "longitudinal slot" in the form of a space between its limb portions, similar to a frame strut with a U or C-shaped cross-section.

It can preferably be provided that the support sockets each have, on sides facing each other in the direction of a narrow side or a long side, a cut-out which, in the transport position of the frame struts, runs substantially in alignment with their longitudinal slot and may project into the one insertion end portion of the bottom storage platform in each case.

A number of storage platforms can be stacked one on top of the other on the base platform, each of which is rectangular and has one mounting member in each corner region, which has an insertion end portion that may run along the respective narrow side and end freely in the direction of a long side located next to it in each case, where, in the storage position of the frame struts, the insertion end portions of one storage platform in each case can be inserted in four insertion recesses located at the same height and, in the transport position of the frame struts, project into the longitudinal slots.

It is obviously irrelevant to the invention whether, in the storage position, the frame struts are arranged in such a way that the insertion recesses face towards one another in the longitudinal direction or in the direction of the narrow sides of the base platform. In each case, it is possible to obtain the advantageous transport position of the invention by inserting them rotated by 180°.

It is appropriate to provide that the support sockets have a square socket cross-section.

In addition, the invention proposes that each support socket should be closed off at its lower end by a stop member corresponding in cross-section to its socket cross-section and protruding across the respective lower end, so that several base platforms can be stacked in a centered manner.

Apart from that, it is preferably proposed that the frame struts are made substantially square in cross-section, i.e. C-shaped, U-shaped or even L-shaped for example, with limbs or webs of equal length in each case. In the case of a C-shape, the longitudinal slot can, for example, have a width amounting to 20% to 90% of the side length of the square shape, e.g. 50%.

An appropriate embodiment is characterised by the fact that the base platform is provided on its underside with rollers, such as four fixed rollers or two fixed and two steering rollers.

It is advantageously proposed that the insertion recesses in the frame struts should have an alternating first and second shape or contour, so that it is easier to hang a storage platform in horizontally.

It can be provided that the frame struts associated in each case with a narrow side of the base platform are connected in pairs at their free upper ends with one U-shaped plug-in yoke each.

The base platform may have a floor and pan-like peripheral rim.

The base platform can be provided on each of its narrow sides with a protrusion projecting in the longitudinal direction between corner regions of a rectangular basic shape of the base platform. The protrusion may be sectoral, trapezoid or rectangular in shape.

In addition, an overflow may (in each case) be arranged within one or both protrusion(s). The overflow may be height-adjustable in order to define a particular level of liquid within the base platform.

The at least one storage platform can have a floor and a peripheral rim, its outline preferably being substantially identical to that of the base platform.

The base platform may be provided with centering means for a storage platform to be stacked on it. The centering means may in particular be arranged on the protrusions, and may be formed by pins or plate-like members fixed to the inside or outside of the rim and projecting upwards above the rim.

It is preferably proposed that, in the transport position, the at least one storage platform is stacked on the base platform the opposite way round to the position when in use, i.e. with its upper side facing downwards.

This is a major advantage, because no rainwater can collect in the storage platforms. Since the watering and transport devices are stored in the open as rule, water can collect in each storage platform via the drainage system when they are stored for a lengthy time. This is very unpleasant when the storage platforms are needed again. On the other hand, storing them in a covered area is very cost-intensive.

The invention further proposes that the at least one storage platform is provided on its underside with a centering means for a storage platform stacked on top of it in the transport position, i.e. when both or all the storage platforms are stacked the opposite way round. The centering means may be formed by reinforcements which are U or V-shaped in cross-section and run between narrow sides and are fixed to the floor on the underside, and which may in each case terminate in transition regions between corner regions and the protrusion on the storage platform. Alternatively such reinforcements may be provided in the transverse direction, i.e. between long sides.

In addition, it is proposed that the storage platforms may be provided, at their insertion end portions, with two mutually opposing notches with which they can be placed on or hung in webs, optionally in a position for use or, turned upside down, in a covered position, which webs partially bridge the respective longitudinal slots in the frame struts. In this context, it is preferably proposed that, for each frame strut, one or two adjacent webs should be disposed in the region of the end portions of the frame strut.

The invention further relates to a base platform for a watering and transport device for plants, with a rectangular, substantially flat floor, in each corner region of which is disposed, perpendicular to the floor or its extended plane, a support socket to receive a frame strut, the base platform being characterised by the fact that each support socket is provided with a slot-like cut-out running perpendicular to the floor, beginning at a free end of the support socket distal from the floor, with two cut-outs in each case facing each other in the direction of a long or narrow side of the base platform.

The base platform is intended in particular for use with four frame struts and at least one storage platform as described above.

The support sockets are preferably square in socket cross-section. In addition, it can be provided that each support socket is sealed off at its lower end by a stop member corresponding in cross-section to the socket cross-section and protruding across the respective lower end, so that several base platforms can be stacked in a centered manner.

It is appropriate for the base platform to be provided on its underside with rollers, such as four fixed rollers or two fixed and two steering rollers.

The base platform may have a peripheral rim around the floor, like a pan. On each of its narrow sides, a protrusion can be provided, projecting in the longitudinal direction between corner regions of a rectangular basic shape of the base platform. The protrusion may be sectoral, trapezoid or rectangular in shape. An overflow may (in each case) be arranged within one or both protrusion(s), which may be height-adjustable.

The base platform may be provided with centering means for a storage platform to be stacked on it.

BRIEF DESCRIPTION OF THE DRAWINGS

Further benefits and features of the invention will become apparent from the following description of a working embodiment, reference being made to a drawing, in which FIG. 10 shows a corner region of the base platform of the device according to the invention, without a frame strut held in it, FIG. 11 shows an enlarged partial view in accordance with FIG. 10, FIG. 12 shows a view of a corner region of the device in accordance with FIG. 4.

DETAILED DESCRIPTION OF THE INVENTION

Figure 1:
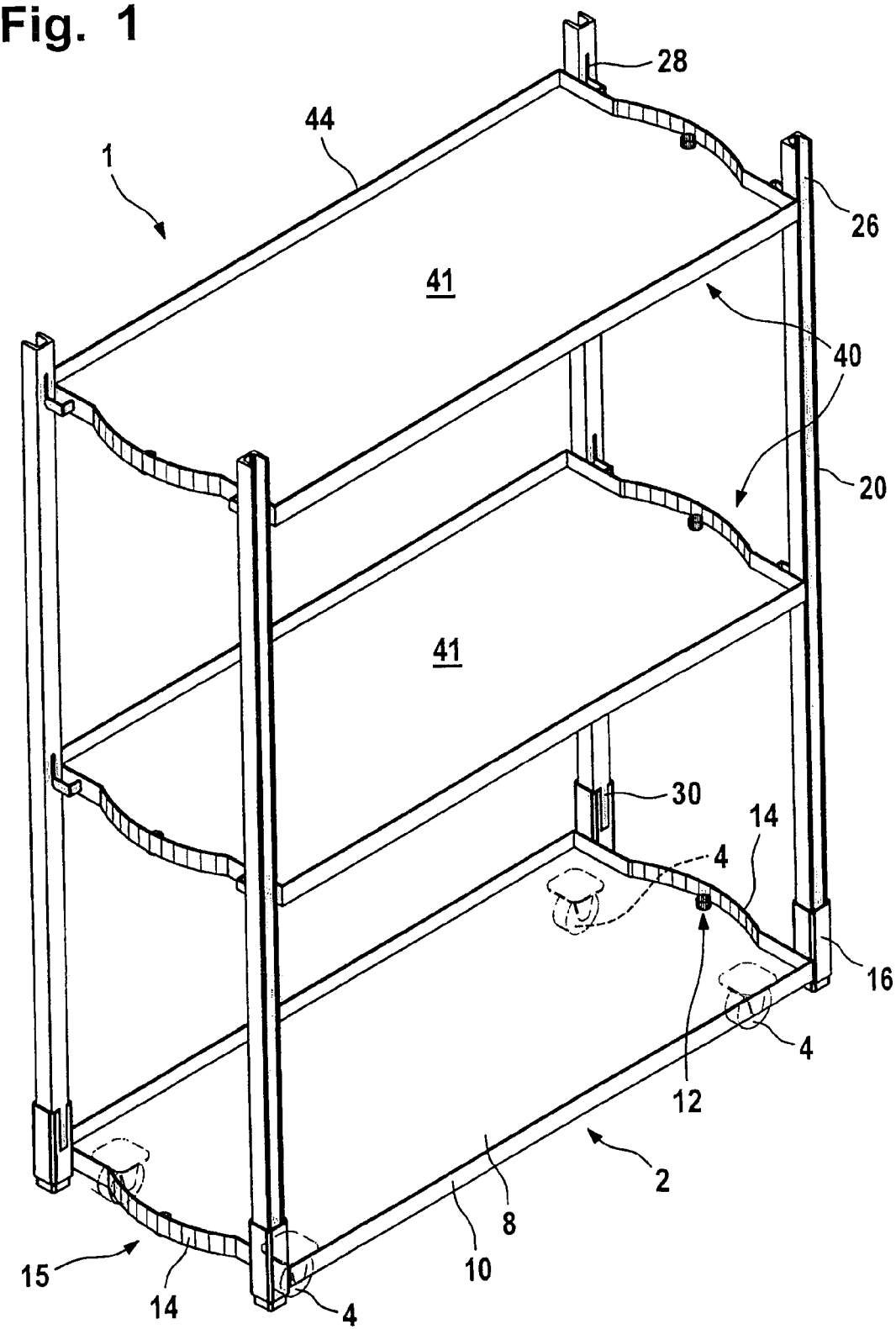
FIG. 1 shows a watering and transport device with a base and two storage platforms in a storage position.
Figure 2:
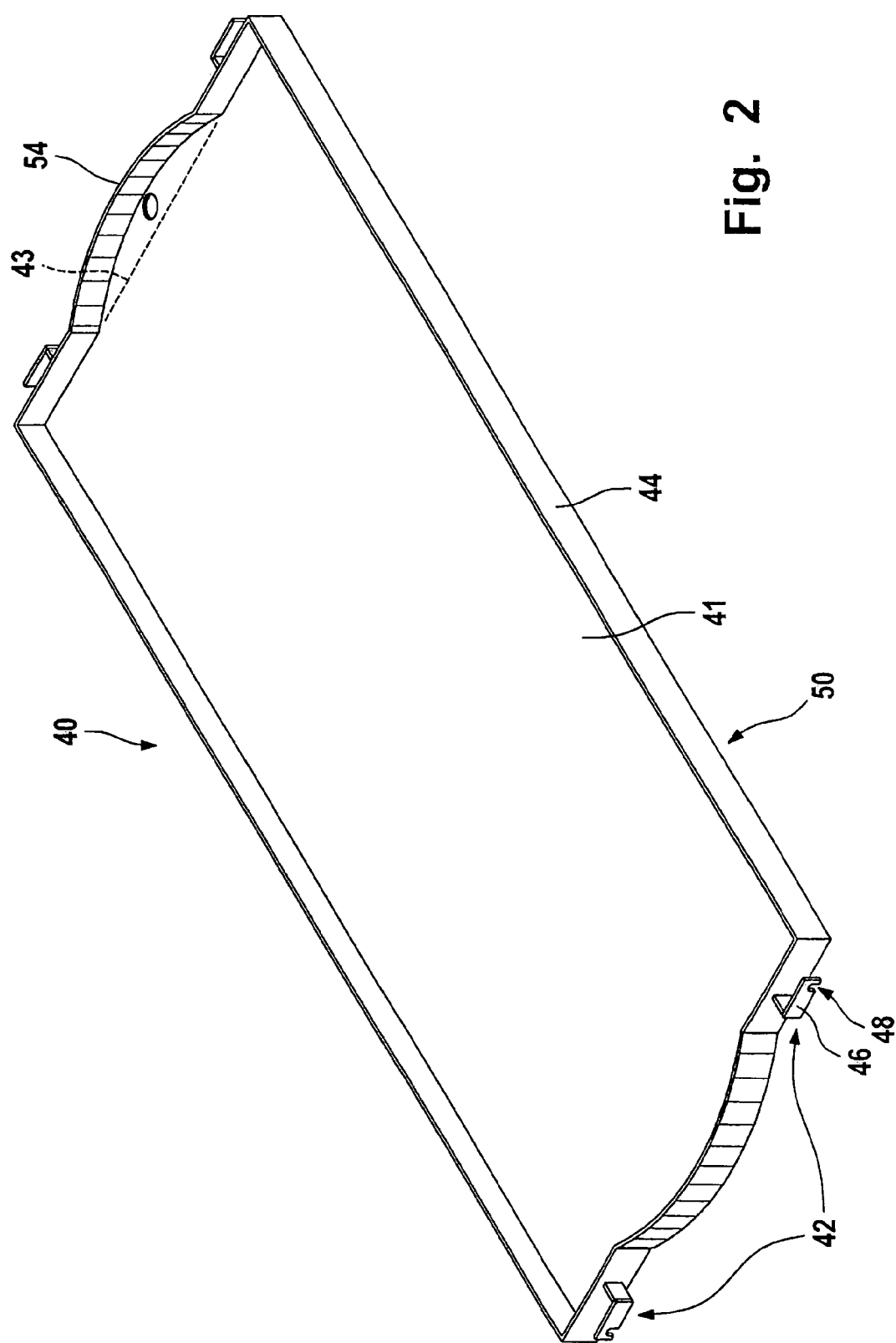
FIG. 2 shows a storage platform of the device according to FIG. 1.
Figure 3:
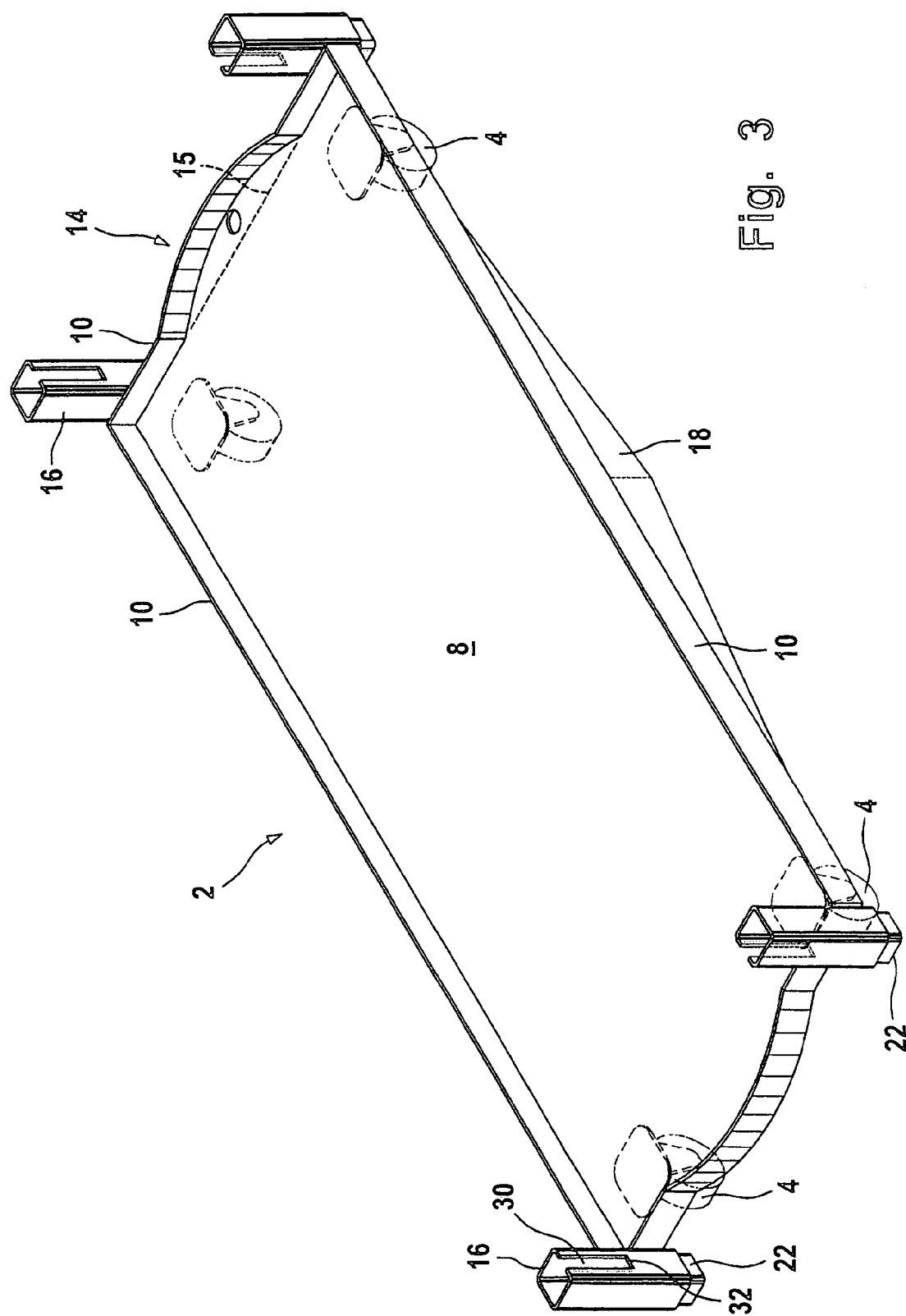
FIG. 3 shows a base platform of the device according to FIG. 1.

Turning first to FIGS. 1 to 3, in which an embodiment of the invention is illustrated. The device 1 first of all has a rectangular base platform 2, which is either intended for standing directly on the ground or alternatively, as shown, may be provided with rollers so that it can be moved around, one of which can be seen in FIG. 1 and is indicated by a 4. Two fixed rollers may be disposed on one narrow side of the base platform, for example, and two castors on the opposite narrow side in order to make it possible to move the device about easily and flexibly.

The base platform 2 has a substantially flat floor and a rim 10 enclosing it like cheeks, so that a surface for holding plant containers is formed on which water or a nutrient solution can stand, up to a certain depth. In order to regulate the level of the liquid, an adjustable overflow 12 is disposed in a corresponding opening in the floor 8, or one overflow is disposed on each of the mutually opposing narrow sides of the floor 8, so that plants stored there can be supplied with water in the best possible way.

As is also shown in FIG. 3 in particular, the floor 8, or the base platform 2, is not precisely rectangular in shape, but instead has an arcuate protrusion 14 on each of the narrow sides, within which is disposed the overflow 12, so that the actual rectangular area of the floor 8 is available for plant containers, without being restricted by an overflow 12. Since the protrusion 14 basically serves as a location for the overflow 12, it could also be of any other shape desired, such as trapezoid (as illustrated elsewhere in the drawing), rectangular or some other shape, provided it is ensured that the rectangular area of the floor, as defined by the outer corners, is available without being restricted by an overflow 12, i.e. the overflow and the protrusion are located outside the narrow side 15 of the base platform 2 indicated by dashed lines in FIG. 3.

Figure 4:
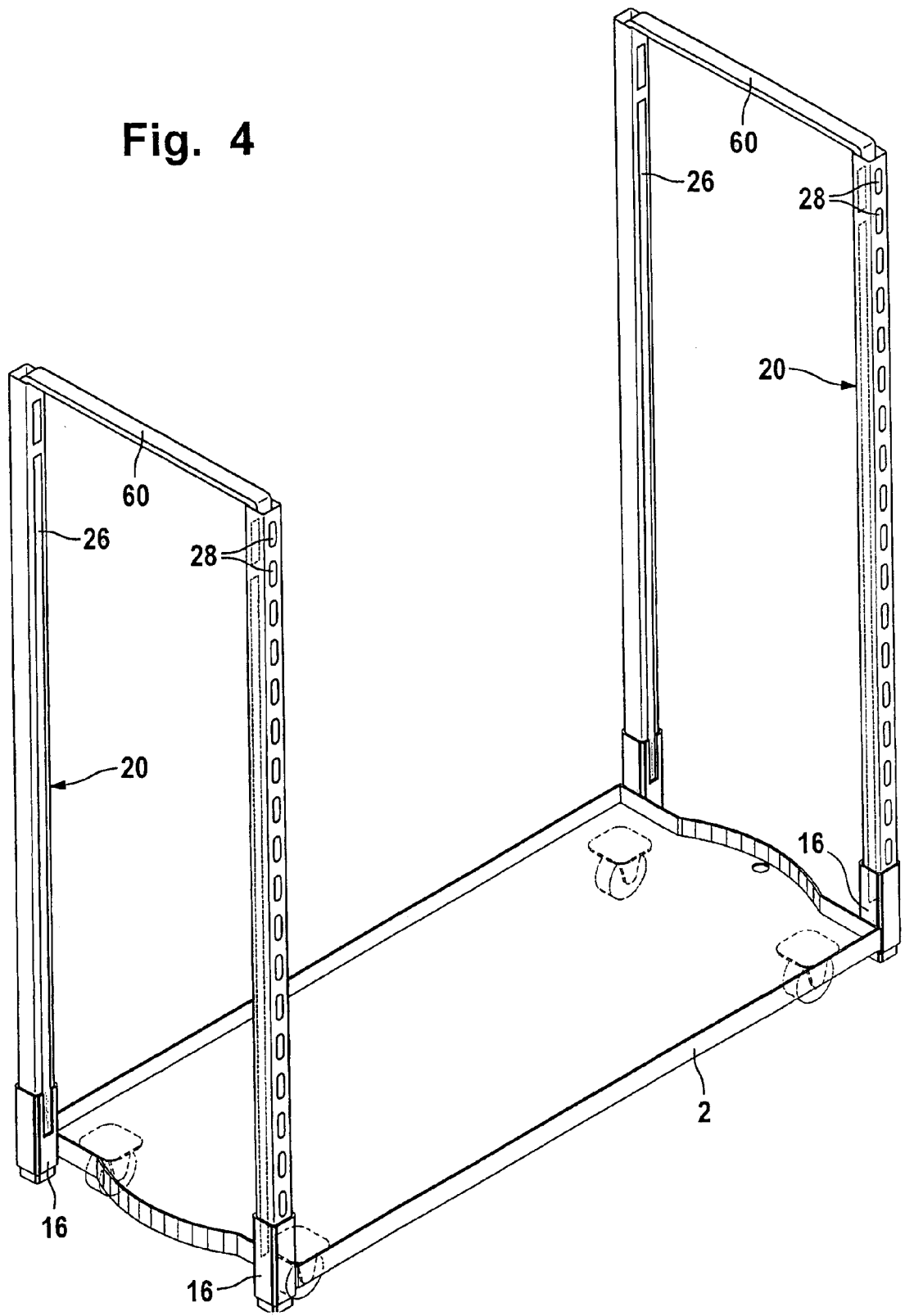
FIG. 4 shows a device in accordance with the invention with a base platform and frame struts.

As is shown by FIG. 1 and particularly by FIGS. 3 and 4, a support socket 16 is disposed vertically, or perpendicular to the floor 8 at each corner of the base platform 2, which serves first of all to receive one frame strut 20 each. An internal free cross-section of the support sockets 16 is square in this example, as is the external cross-section contour of the frame struts 20, the internal cross-section dimensions of the support sockets 16 being slightly larger than the external cross-section dimensions of the frame struts 20, thus ensuring that they are easy to plug together and are held in place with little play.

There is a stop member 22 inserted in a lower region of each support socket 16 and fastened there, e.g. by welding. The object of the stop members 22 consists, on the one hand, in forming a height stop for the frame struts 20 plugged in from above, so that they are maintained at a fixed height, and on the other hand, in forming a centering means, so that a number of base platforms 2 can be stacked one on top of the other without frame struts 20 plugged in, in which case a region of a stop member 22 projecting up from a support socket 16 engages from above in a support socket 16 of a base platform 2 arranged below it. The stop members 22 could therefore be open, like tubes, or alternatively they could be closed across their cross-section.

On the bottom of each of its long sides, the base platform 2 has a slightly V-shaped stiffener 18, which, on the one hand, serves to increase the static stability and, on the other hand, contributes to ensuring that the base platform, or a laden, complete watering device (FIG. 1) is lifted by a fork-lift truck only in such a way that its prongs engage laterally, outside the reinforcement. The stiffener could alternatively consist of a length of pipe.

In the embodiment according to FIGS. 4 to 14, the frame struts 20 are square in cross-section and, centrally in a side wall 23 (FIG. 12), have a continuous longitudinal slot 26 running in the longitudinal direction, while a number of regularly spaced insertion recesses 28 are formed in a side wall 24 of the frame strut opposite the longitudinal slot 26. The alternate insertion recesses 28 are formed slightly differently—in the present example, in that every other insertion recess is smoothly oval, whereas the insertion recesses between them are oval in shape, but with small bulges to the side. The purpose of this arrangement is to make it easier to hang in the storage platforms, which will be described in more detail below, in the horizontal direction.

Figure 13:
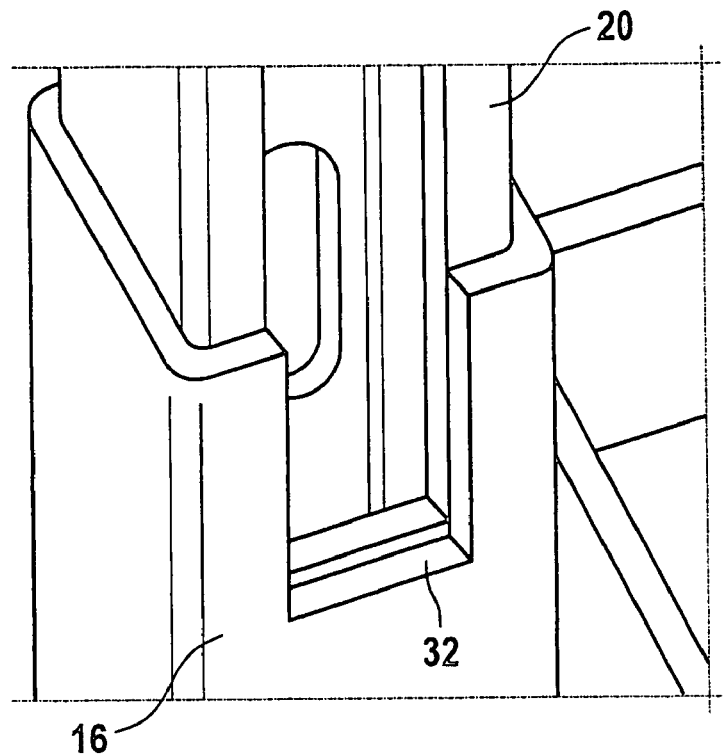
FIG. 13 shows an enlarged view in accordance with FIG. 12.
Figure 14:
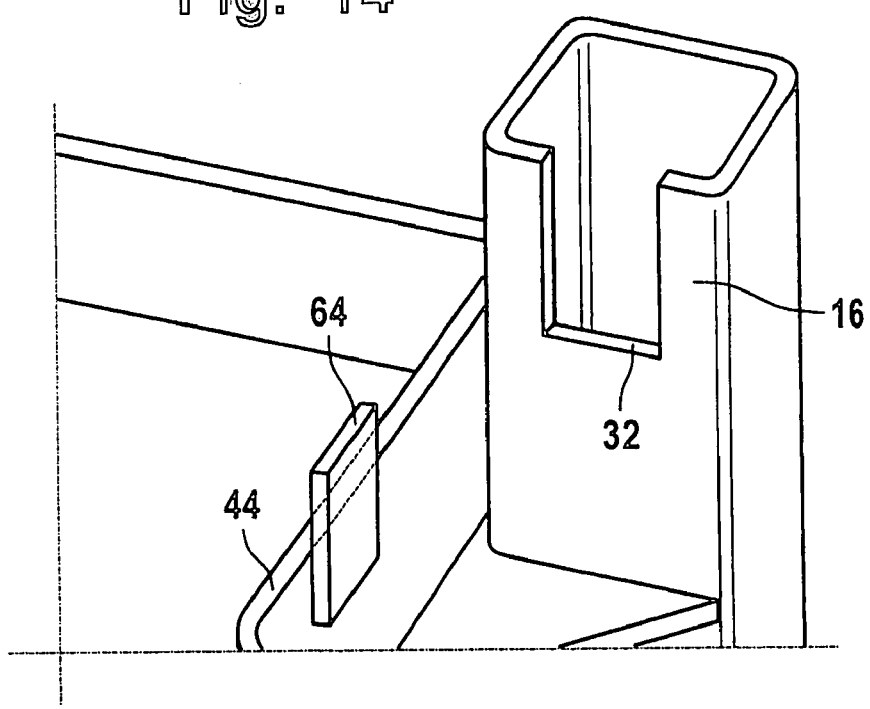
FIG. 14 shows a corner region in accordance with FIG. 11 with a centering means.

As is also shown in FIGS. 3 and 4 and esp. FIGS. 11 to 13, the support sockets 16 are each provided, on their side facing in the direction of the respective narrow side, or towards the protrusion 14, with a cut-out 30, the lower rim 32 of which is located a certain height above the floor 8 or the upper edge of the rim 10, the purpose of which will be explained below.

FIGS. 5 to 8 show an arrangement in which a number of storage platforms 40 are stacked one on top of the other in the position when in use on the base platform 2. The storage platforms 40, one of which is shown in FIG. 2, have a floor 41 that is basically rectangular, and a rim 44 enclosing it like a pan, which correspond in shape and size to the base platform 2, with the difference that they are designed for hanging in the frame struts 20 and do not have any support sockets and rollers. An overflow is disposed within protrusions 54, which are shown here in the shape of sectors, or one overflow in each protrusion. Each storage platform has, in each of its corner regions, a hook-shaped mounting member 42 which is welded to the rim 44. Each mounting member 42 has an insertion end portion 46 running parallel to a narrow side 43 of the rectangle forming the storage platform 40, and ending freely, the insertion end portion being provided with a notch 48 arranged perpendicularly to the extended plane of the storage platform 40. The insertion end portion 46 faces in the direction of an adjacent long side 50 of the storage platform 40, i.e. outwards, so that, in the arrangement shown in FIGS. 5 to 7, it extends through the longitudinal slot 26 in the frame strut 20.

FIGS. 5 to 8 show the storage platforms 40 stacked in such a way that each individual storage platform is placed upside down (in the covered position) on the base platform 2 or on a storage platform beneath it, i.e. the floor of the storage platforms faces downwards. Attached to the floor 41 are bracing profiles 58, U-shaped in cross-section, which increase the load-bearing capacity of the floor or storage platform and at the same time, with their facing edges at the ends, serve as a means for centrally positioning a further storage platform placed on the stack from above. The profiles 58 could alternatively be V-shaped in cross-section in order to improve the centering effect.

Figure 5:
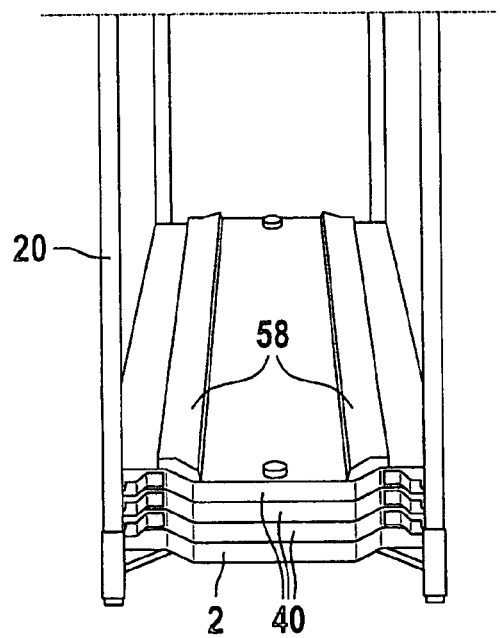
FIG. 5 shows a perspective partial view of a device according to FIG. 4 with several stacked storage platforms.
Figure 7:
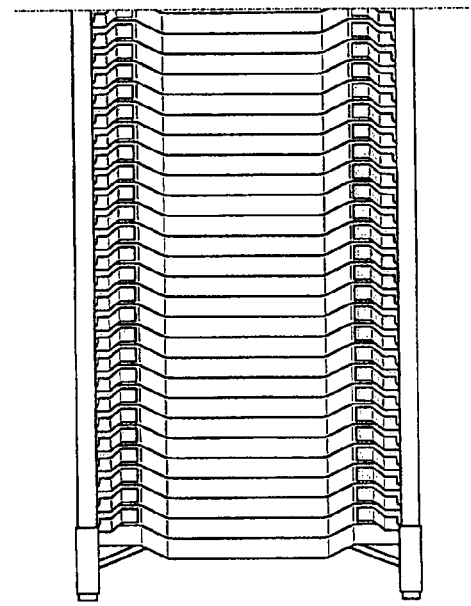
FIG. 7 shows a perspective partial view of a device in accordance with the invention with a larger number of storage platforms than FIGS. 5 and 6.
Figure 6:
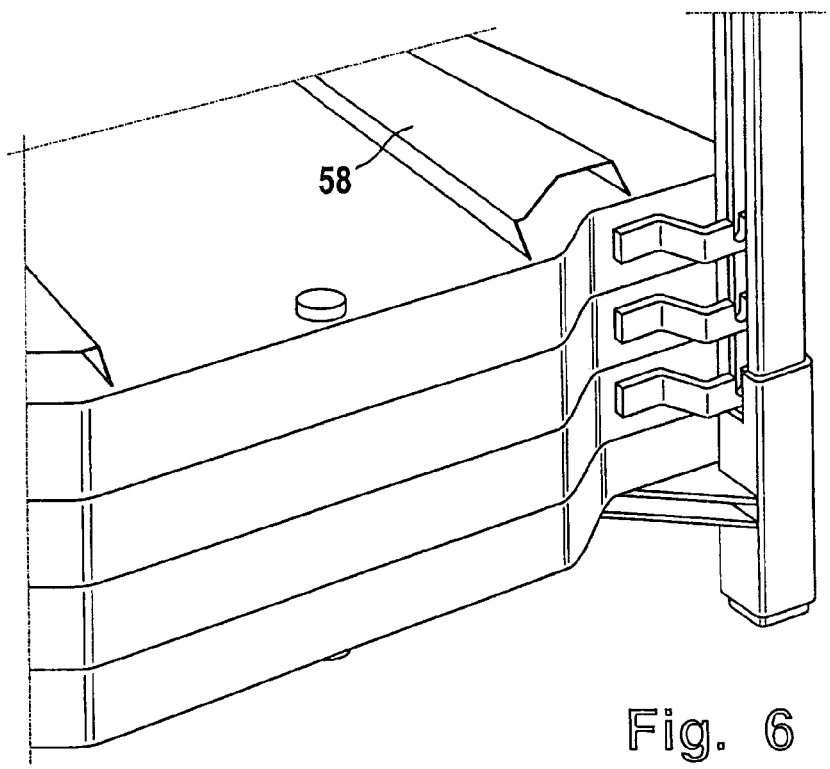
FIG. 6 shows an enlarged view of a corner region of the device according to FIG. 5.

As can be seen from the illustrations according to FIGS. 4 to 6 in combination with FIG. 1, the frame struts 20 can, in a first step, be inserted into the support sockets 16 in a position rotated by 180° compared to the situation shown in FIG. 4, so that it is no longer the longitudinal slots 26 which are facing one another (transport position, according to FIGS. 4 to 6), but rather the insertion recesses 28 (FIG. 1), this latter position being referred to as the storage position. In a second step, storage platforms 40 can then be inserted anywhere that is desired into insertion recesses 28 in a position rotated by 180° compared to FIGS. 5 and 6 (about a horizontal axis), the floor 41 of which is then facing upwards in accordance with the positioning of the base platform 2, the mounting members 42 engaging with their insertion end portions 46 through the insertion recesses in the frame struts 20, and the notches 48 of the insertion end portions 46 each engaging on lower rim portions of the insertion recesses 28, see FIG. 1, where the insertion recesses 28 are merely indicated by dashes.

The invention thus provides a base platform for a watering and transport device for plants and a watering and transport device equipped with such a base platform, consisting of a base platform with four frame struts plugged in. In a transport position (FIG. 4) for the frame struts, an optional number of storage platforms can be stacked on the base platform. In this context, the stacking process leads to a considerable simplification, since the empty storage platforms do not have to be hung in the insertion recesses 28, for example, but can instead be stacked loosely, one on top of the other, because the frame struts are positioned in such a way that their longitudinal slots 26 face inwards and can loosely accommodate the insertion end portions. Conversely, in a storage position for the frame struts, in which the longitudinal slots face outwards and the insertion recesses face towards one another, the storage platforms can each be hung in the insertion recesses at the desired height.

The transport position thus offers the advantage that the storage platforms can be stacked close together, so that when the full height of the frame struts is used, a larger number can be housed than would be the case if they were hung in the insertion recesses, and, furthermore, the process of placing them in or stacking them takes considerable less time than hanging them in.

Figure 8:
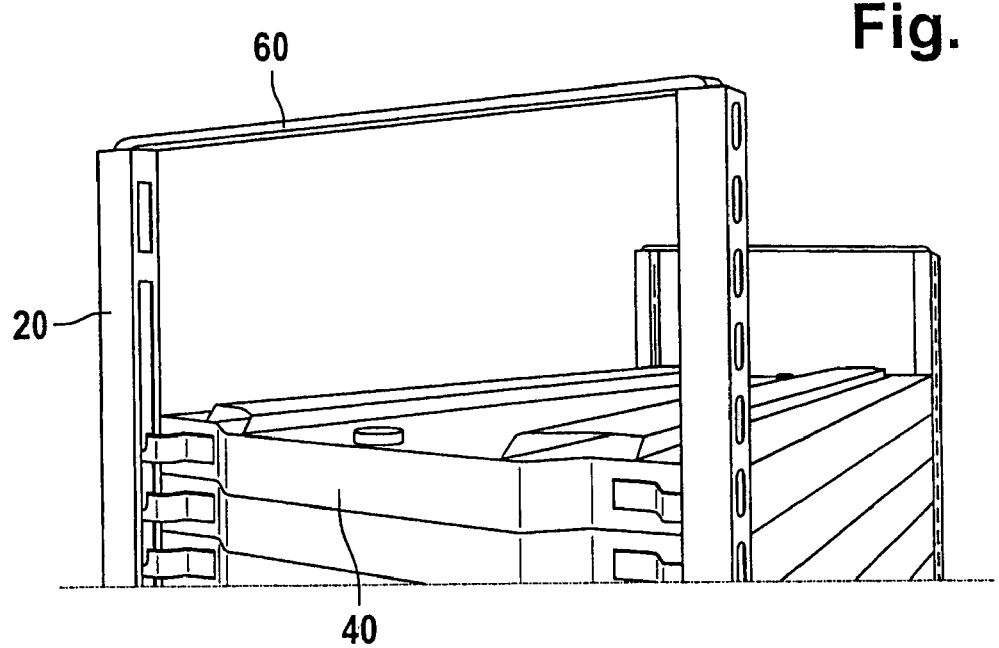
FIG. 8 shows an upper region of the device according to FIG. 7.

FIG. 8 shows a device in which upper ends of the frame struts are connected together by a U-shaped plug-in yoke 60, as is also indicated in FIG. 4, where parallel limbs of the yoke (not visible) running in the longitudinal direction of the frame struts 20 engage in the free cross-sections of the frame struts 20 and prevent them from moving apart, since in such a case, mounting members of storage platforms located higher up would no longer be reliably received in the longitudinal slots of the frame struts. It goes without saying that plug-in yokes of this kind are not needed in the storage state, because in that case the storage platforms determine the relative spacing of the frame struts 20 with their notches 48.

Figure 15:
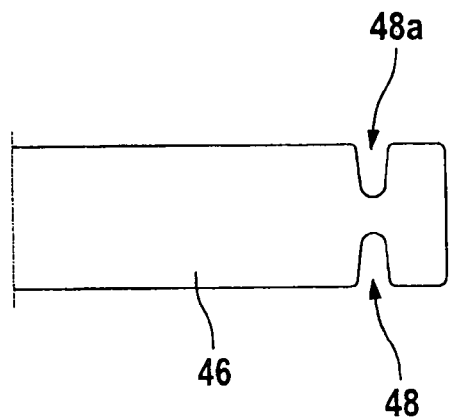
FIG. 15 shows an alternative embodiment of an insertion end portion of a storage platform.
Figure 16:
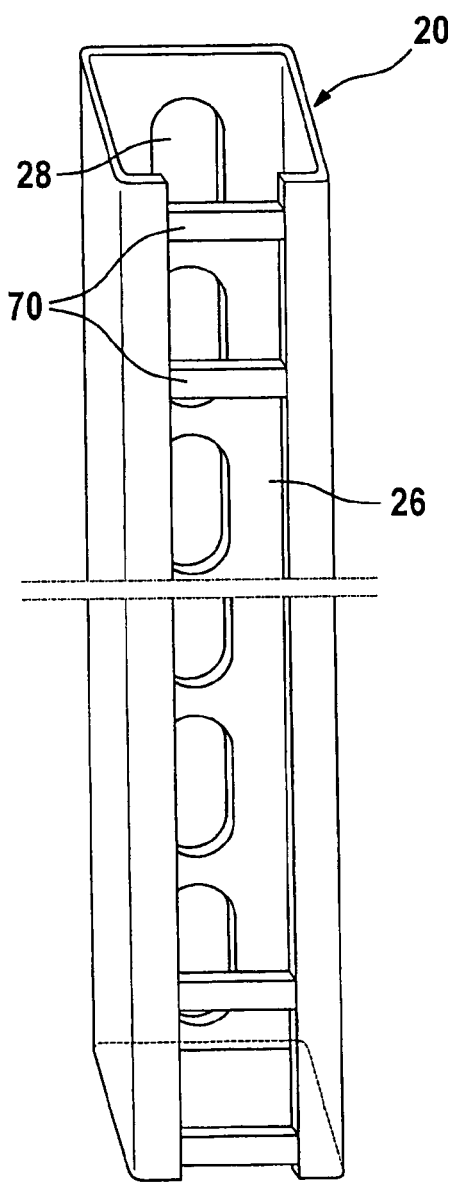
FIG. 16 shows an alternative frame strut.
Figure 17:
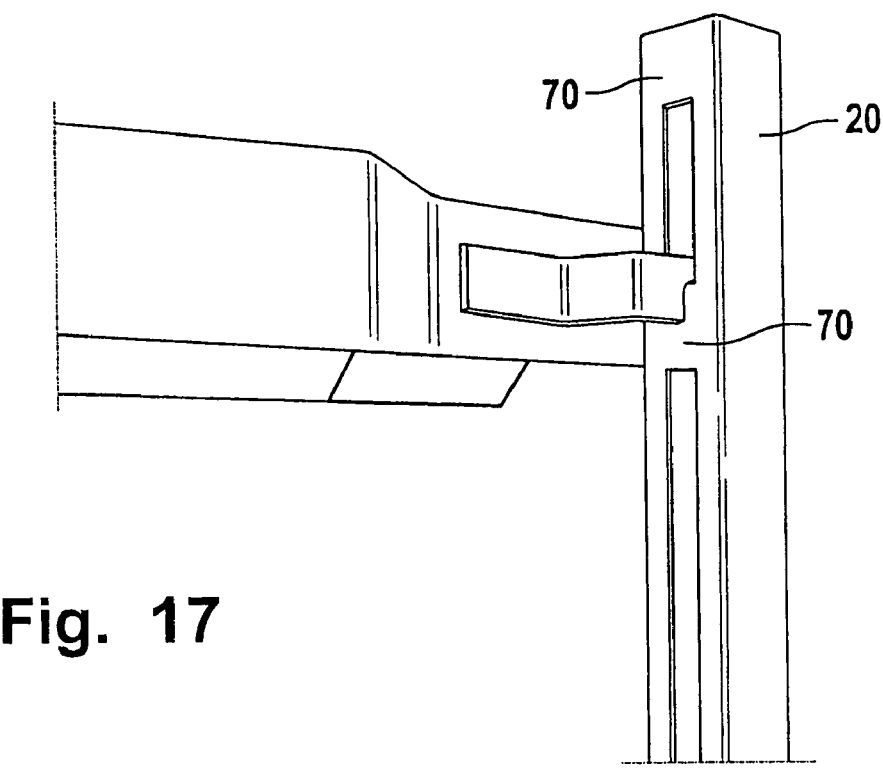
FIG. 17 shows the frame strut according to FIG. 16 in use.

As an alternative to the use of a yoke, it can be provided that the insertion end portions 46 of the storage platforms are provided with not one, but two notches 48, 48a, as is illustrated in FIG. 15. In addition, the frame struts 20 (FIG. 16) are provided in their end portions with one or two spaced apart ridges 70 bridging the longitudinal slot 26, so that the possibility exists, even in the transport position of the frame struts, in which no storage platforms can normally be hung, of placing an uppermost storage platform upside down (covered position) on top of the webs which are facing one another, i.e. so that the additional notches 48a facing the notches 48 which are normally used are latched in the webs 70 and in this way prevent the frame struts from moving apart from one another at the top. As a consequence of this, plug-in yokes may be dispensed with. This situation is illustrated in FIG. 17, though with a storage platform whose insertion end portions have only one notch 48 and which are shown in their normal orientation (position in use).

Figure 9:
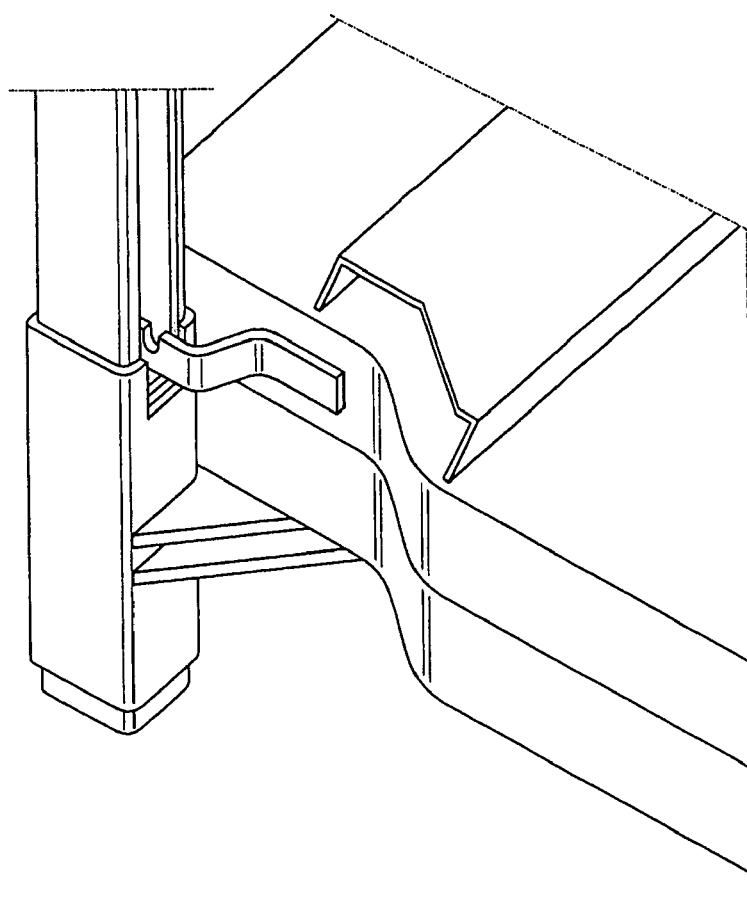
FIG. 9 shows a corner region similar to FIG. 6 on an enlarged scale.

As FIG. 9 shows, in the transport position, the mounting members 42 or their insertion end portions 46 do not rest on the support sockets 16 bearing a load, but extend freely into the cut-out 30, a certain space always remaining between a lower edge of an insertion end portion 46 and the lower rim 32 of a cut-out 30. This ensures that the entire load of all the storage platforms 40 stacked up does not have to be borne by the mounting members 42 of the bottom storage platform, but is instead transmitted to the base platform 2 via its entire rim 44. Since the cut-out 30 thus merely has the task of creating a certain clearance for the mounting member of the bottom storage platform, it could alternatively be provided that the support sockets 16 all terminate at a height corresponding to the lower rim 32 of the cut-out. In such a case, it ought conveniently to be ensured that, in addition, a number of base platforms 2 can be stacked one on top of the other; in this case, space for the rollers 4, where present, needs to be available between two base platforms.

Figure 18:
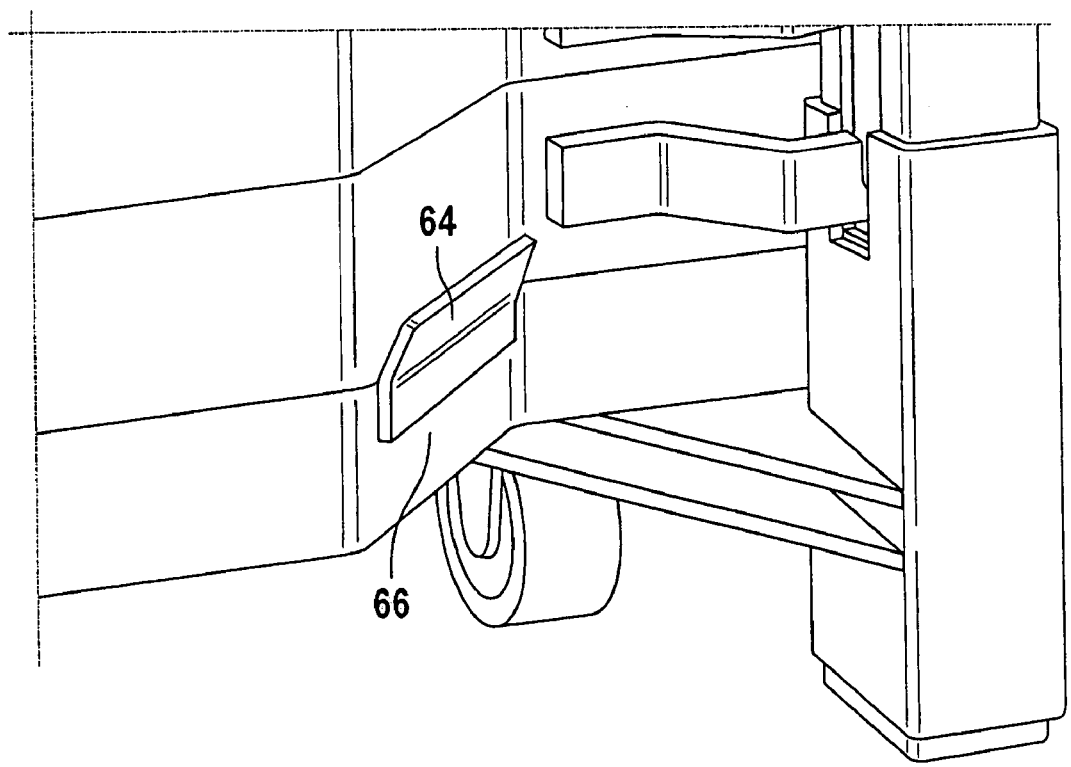
FIG. 18 shows a variant of a centering member.

As has already been explained with reference to FIGS. 5 and 6, the storage platforms 40 have a centering means in the form of the bracing profiles 58. In order to ensure a centered position of a bottom storage platform, namely directly on the base platform 2, i.e. a position in which the rim 44 of the storage platform is resting substantially in alignment on the rim 10 of the base platform 2 without any lateral displacement occurring, it is possible for centering members 64 to be attached to the rim 10 of the base platform 2 in accordance with FIG. 14. In the case illustrated, two plate-like centering members 64 are welded to each side of the rectangle, i.e. to the long and narrow sides of the base platform 2, at the rim 10, from the outside in the case shown, a part of the plate-like centering member 64 projecting upwards over the rim 10 and thus forming a means for centrally positioning a storage platform 40 placed on it. The upwardly projecting part of the centering member 64 may, as is shown for a variant in FIG. 18, be bent slightly outwards in order to facilitate placing a storage platform on it. Alternatively, the centering member(s) 64 could be attached to the inside of the rim 10. Modifying this idea, it goes without saying that other designs of a centering member are conceivable, such as a rod-like, centering member aligned perpendicularly to the floor 8. It is preferably proposed to provide only four centering members in an embodiment in accordance with FIG. 12 in regions 66 of the rim 10 corresponding to the slanting trapezoid limbs of the protrusions 14 (or the arcuate region in an embodiment in accordance with FIG. 3), in order in this way to manage with a smaller number of centering members (FIG. 18).

The invention has been explained above with reference to a base platform in accordance with FIG. 13 and a watering and transport device in accordance with FIGS. 4 to 7 which has been formed with it; in this case, the storage platforms 40 used in connection with it are provided with insertion end portions 46, aligned in the transverse direction relative to the rectangular shape, which, depending on the position (transport or storage position) of the frame struts 20 engage in their longitudinal slots or insertion recesses, which then face each other or face away from one another in the transverse direction.

In an alternative embodiment, the storage platforms might be provided with insertion end portions terminating in the longitudinal direction (relative to the rectangular basic shape, i.e. parallel to the long sides 50); in this case, the frame struts 20 need to be arranged rotated in each case by 90° relative to the embodiment shown so that this time, in the transport or storage position, the longitudinal slots or insertion recesses face each other, namely relative to the longitudinal direction of the device. Similarly, with an embodiment of this kind, the cut-outs 30 of the support sockets 16 would have to be arranged such that they face each other when seen in the longitudinal direction, i.e. rotated in each case by 90° compared to the embodiment illustrated, so that they fulfill their purpose, which consists in ensuring that the insertion end portions of a storage platform stacked at the very bottom in the transport position do not need to bear any load.

What is claimed is:

1. A watering and transport device for plants, comprising:

a rectangular base platform and a plurality of storage platforms, the base platform having a first side and a second opposite side and four corner regions in which each is disposed, perpendicularly thereto, a support socket, each support socket receiving a frame strut in a vertical position, the frame strut being provided with a continuous longitudinal slot, and a number of insertion recesses adjacent to and/or opposite the longitudinal slot, wherein the frame struts are capable of being arranged in the support sockets in a position for transporting the device in which on each side of the base platform, the longitudinal slots of the two frame struts face each other and their insertion recesses face away from one another, and wherein said frame struts are capable of being arranged in the support sockets in a position for storing plants in which on each side of the base platform, the insertion recesses of said frame struts face each other and the longitudinal slots face away from one another, and wherein the plurality of storage platforms are capable of being stacked one on top of the other on the base platform, each storage platform is rectangular and has one mounting member in each corner region, which has an insertion end portion ending freely, wherein in the storage position of the frame struts, the insertion end portions of each storage platform can be inserted into four insertion recesses located at the same height and, in the transport position of the frame struts, the insertion end portions project into the longitudinal slots, wherein each support socket has an upper rim portion located at such a height (h) above the base platform that there is a vertical space between it and the insertion end portions of the mounting members of the storage platform when it is stacked at the bottom such that said mounting members do not rest on the support sockets when the frame struts are in the transport position.

2. The device as claimed in claim 1, wherein the support sockets have, on a side facing one another, a cut-out, the lower rim of which is located at the height (h) above the base platform and which, in the transport position of the frame struts, runs in alignment with their longitudinal slot.

3. The device as claimed in claim 1, wherein the support sockets have square socket cross-section.

4. The device as claimed in claim 1, wherein each support socket is closed off at its lower end by a stop member corresponding in cross-section to its socket cross-section and protruding across the respective lower end, so that several base platforms can be stacked in a centered manner.

5. The device as claimed in claim 1, wherein the frame struts are made C or U-shaped in cross-section and substantially square.

6. The device as claimed in claim 1, wherein the base platform is provided on its underside with rollers.

7. The device as claimed in claim 1, wherein the insertion recesses in the frame struts have an alternating first and second shape.

8. The device as claimed in claim 1, wherein the base platform has a floor and a pan-like peripheral rim.

9. The device as claimed in claim 1, wherein the at least one storage platform has a floor and a peripheral rim, its outline being substantially identical to that of the base platform.

10. The device as claimed in claim 1, wherein the base platform is provided with centering means for a storage platform to be stacked on it.

11. The device as claimed in claim 1, wherein, in the transport position, the at least one storage platform is stacked on the base platform with its upper side facing downwards.

12. The device as claimed in claim 11, wherein the at least one storage platform is provided on its underside with a centering means for a storage platform stacked on top of it in the transport position.

13. The device as claimed in claim 1, wherein the storage platforms are provided, at their insertion end portions, with two mutually opposing notches, with which they can be placed on or hung in webs, optionally in a position for use or, turned upside down, in a covered position, which webs partially bridge the respective longitudinal slots in the frame struts.

14. The device as claimed in claim 13, wherein, for each frame strut, one or two adjacent webs are disposed in the region of the end portions of the frame strut.

* * * * *